US010461992B1

United States Patent
Sagar et al.

(10) Patent No.: US 10,461,992 B1
(45) Date of Patent: Oct. 29, 2019

(54) DETECTION OF FAILURES IN NETWORK DEVICES

(71) Applicant: Amazon Technologies, Inc., Seattle, WA (US)

(72) Inventors: Gaurav Sagar, Seattle, WA (US); Mike Dang Nguyen, Kent, WA (US); Alessandro Parini, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/716,253

(22) Filed: Sep. 26, 2017

(51) Int. Cl.
| H04L 1/00 | (2006.01) |
| H04L 12/24 | (2006.01) |
| H04L 12/707 | (2013.01) |
| H04L 12/733 | (2013.01) |
| H04L 12/947 | (2013.01) |
| H04L 12/741 | (2013.01) |

(52) U.S. Cl.
CPC .......... *H04L 41/0668* (2013.01); *H04L 45/20* (2013.01); *H04L 45/22* (2013.01); *H04L 45/74* (2013.01); *H04L 49/25* (2013.01)

(58) Field of Classification Search
None
See application file for complete search history.

(56) References Cited

U.S. PATENT DOCUMENTS

| 2002/0120727 A1* | 8/2002 | Curley | H04L 41/12 709/223 |
| 2003/0128692 A1* | 7/2003 | Mitsumori | H04L 41/22 370/352 |
| 2004/0105391 A1* | 6/2004 | Charcranoon | H04L 43/0829 370/252 |
| 2004/0199664 A1* | 10/2004 | Feldman | H04L 45/02 709/238 |
| 2007/0283042 A1* | 12/2007 | West | H04L 65/80 709/238 |
| 2008/0063149 A1* | 3/2008 | West | H04L 41/5087 379/1.03 |
| 2010/0054140 A1* | 3/2010 | Stjernholm | H04L 43/10 370/252 |
| 2010/0103822 A1* | 4/2010 | Montwill | H04L 41/0677 370/242 |
| 2016/0105453 A1* | 4/2016 | Xue | H04L 43/10 726/23 |
| 2017/0149639 A1* | 5/2017 | Vasseur | H04L 43/0835 |
| 2018/0219760 A1* | 8/2018 | Li | H04L 43/10 |

* cited by examiner

*Primary Examiner* — Kwang B Yao
*Assistant Examiner* — Juvena W Loo
(74) *Attorney, Agent, or Firm* — Klarquist Sparkman, LLP

(57) ABSTRACT

In one embodiment, detection of failures in a network device can be achieved by obtaining a last hop of partial traceroutes. For example, the last hops of the partial traceroutes detected in a time period can be sorted by frequency of occurrence. Multiple clusters can be generated, one with last hops that are most frequent and at least one other with the last hops that are less frequent. The hop with the highest frequency and the last hop with the second highest frequency can be compared. If the last hop with the highest frequency exceeds the second highest frequency by a predetermined amount, then the last hop with the highest frequency is alarmable.

20 Claims, 11 Drawing Sheets

DETECTION OF FAILURES IN NETWORK DEVICES

BACKGROUND

Computer networks (within a cloud-computing environment, data-center environment, or other environment) generally comprise various interconnected computing devices that can communicate with each other via network packets to exchange data. When small numbers of devices are interconnected, the devices can be directly connected to each other. For example, one device can be directly connected to another device via a network link and the devices can communicate by sending packets to one another over the network link. However, having direct connections between large numbers of devices is not scalable. Thus, the connections between large numbers of devices will typically be via indirect connections. For example, one device can be connected to another device via an interconnection network comprising one or more routers.

An interconnection network can be created from a small number of large routers. However, large routers can be expensive and a small number of them may provide limited redundancy. Instead, an interconnection network can be constructed from lower cost commodity equipment interconnected as a network fabric. A network fabric can include multiple nodes interconnected by multiple network links. A node can include a networking device that can originate, transmit, receive, forward, and/or consume information within the network. For example, a node can be a router, a switch, a bridge, an endpoint, or a host computer. The network fabric can be architected or organized as a topology of the nodes and links of the communication system. For example, the network fabric can be organized as a multi-tier network fabric such that a packet traversing the network fabric passes through multiple intermediary nodes associated with the different tiers of the multi-tier network.

Typically, the networks provide a variety of options for redundancy and can tolerate faults in a system while continuing to run. However, quick detection of failing components in a repeatable and reliable way is desirable to maximize system throughput. Gray failures, however, often defy detection because they are, by definition, caused by failing components that have infrequent or irregular errors. Example gray failures include packet loss that is random, non-fatal errors, random I/O errors, etc. Gray failures are more difficult to detect because a device has not completely failed. Thus, traditional models for detecting failures, which assume a completely failed device or a device operating correctly, can often leave gray failures largely undetectable.

DETAILED DESCRIPTION

Figure 1:
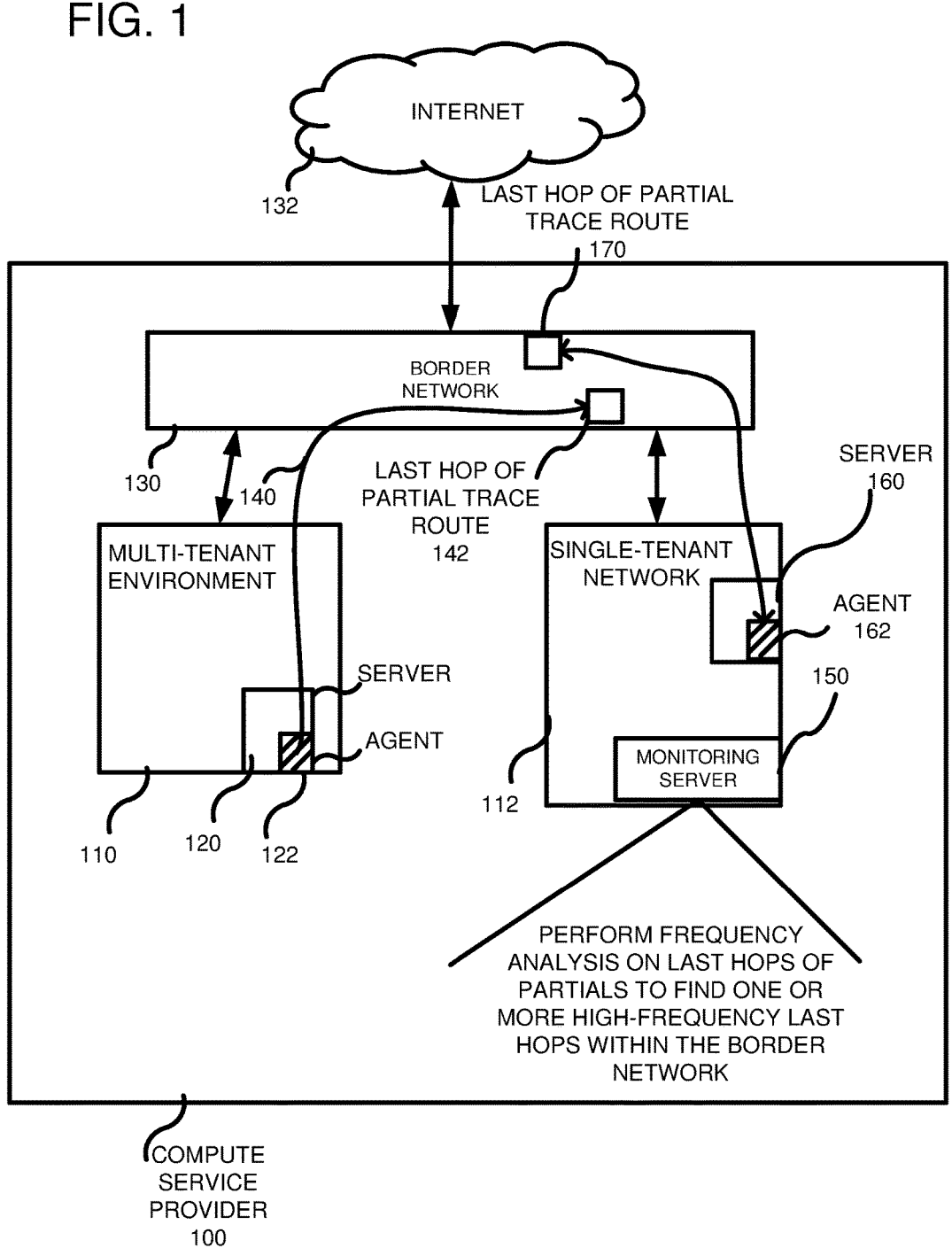
FIG. 1 is a diagram showing a compute service environment wherein failures are detected within a border network fabric.

Gray failures are difficult to detect because they are either not seen by passive monitoring or a low-level loss fails to breach alarm thresholds of the passive monitoring. In one embodiment, a last hop of partial traceroutes is used to detect gray failures. For example, the last hops of the partial traceroutes detected in a time period (e.g., 5 minutes) can be sorted by frequency of occurrence. Multiple clusters can be generated, one with last hops that are most frequent and at least one other with the last hops that are less frequent. A check can be made whether a size of cluster with the most frequent last hops is greater than the size of the other clusters by greater than a predetermined amount (e.g., 20%). If yes, then the loss is considered too dispersed and the data is discarded. Otherwise, the last hop with the highest frequency and the last hop with the second highest frequency can be compared. If the last hop with the highest frequency exceeds the second highest frequency by a predetermined amount (e.g., if the log 10 (highest)–log 10(second highest)>=1 (i.e., 10× more)), then the last hop with the highest frequency causes an alarm to be triggered. Hence, finding a local minima of the frequency of last hops can be used to detect gray failures.

The following description is directed to technologies for active monitoring of network fabrics, such as border network fabrics. In some implementations, monitoring involves sending User Datagram Protocol (UDP) test packets to destination devices in the border network fabric. The UDP test packets are addressed to particular destination devices and have destination ports that have been identified as closed destination ports. Based on results of the UDP test packets, potential network problems within the border network fabric can be identified. Specifically, if the UDP test packet is successfully received by the destination, an Internet control message protocol (ICMP) error packet response will be received. However, if the UDP test packet is not successfully received, then another type of response packet will be received (other than the ICMP error packet response). In addition, the UDP test packet is determined to be unsuccessful if no response is received (e.g., indicating that the UDP test packet did not reach the destination or a response did not return from the destination, both of which can indicate a problem with the border network fabric). If a potential network problem is detected, then traceroute packets can be used to identify last hops (i.e., the last network device that successfully forwarded the traceroute packet) within the network. Once the last hops have been generated, frequency information associated with the last hops can be used to detect problem network devices. The network devices can then be rebooted, taken offline, or replaced.

The technologies described herein are implemented within the context of network fabrics, such as multi-tiered network fabrics. A network fabric is a collection of network devices and resources (e.g., routers, switches, hubs, links, etc.), which can be organized according to various topologies. For example, a network fabric can include a multi-stage network with a plurality of stages. A multi-stage network is a network in which network devices (e.g., routers and/or switches) are organized into a plurality of stages. One type of multi-stage network is a tiered network, such as a Clos network (also called a Clos network fabric or a Clos fabric). The network devices in a given stage forward traffic between the network devices in the previous stage and network devices in the next stage. In some types of multi-stage networks, the network devices in a given stage are fully meshed with the network devices in an adjacent stage (e.g., each router in a first stage is connected to every router in a second stage). In other types of multi-stage networks, the network connections between stages are not fully meshed (e.g., a router in a given stage may not be connected to every other router in an adjacent stage). As another example, groups of network devices in adjacent stages can be interconnected within the group, but not interconnected between groups.

As used herein, the term network fabric refers to one or more collections of networking devices (e.g., routers, switches, hubs, network links, etc.) that are connected to each other, each of which may have a different topology. For example, a network fabric may include collections of networking resources that all have the same topology, or may include different groupings of networking resources of various topologies (e.g., some multi-tiered networks and some networks that are not multi-tiered).

The technologies described herein can be implemented within the context of a border network fabric (also called a border network), which is a network fabric with a particular purpose. A border network refers to a network that connects a local collection of computing resources (which can include computers, servers, networking devices, database systems, storage systems, local network fabrics, and/or other types of computing resources) to external networks. For example, a border network can connect computing resources of a data center or local geographical region to external networks such as the Internet or other types of external networks (e.g., private networks linked to other data centers).

A network fabric can include network devices organized into a number of layers. For example, a border network fabric can be organized into a number of layers supporting traffic flow from local computing resources to external networks (e.g., primarily up/down network flow that travels out from the local computing resources to the external networks or in from the external networks to the local computing resources). Each layer can include network devices organized according to a particular topology (e.g., a multi-tiered network or a network with another topology). Example layers include transit layers, distribution layers, core layers, and aggregation layers.

Monitoring a network fabric, such as a border network fabric, can be difficult. For example, in some monitoring solutions for network fabrics, custom agents are used that are deployed within the network fabrics. However, using custom agents within the network fabric can result in security issues (e.g., maintaining custom agents that are not protected by firewalls), provisioning issues, and/or maintenance issues. As another example, some monitoring solutions employ traceroutes for detecting network problems. However, use of traceroutes as a primary detection mechanism can result in increased traceroute traffic that negatively impacts operation of the network fabric and some network configurations may limit the frequency of traceroutes. In addition, traceroutes may not effectively test the large number of paths that can be present within the network fabric.

Using the technologies described herein, active monitoring of network fabrics, such as border network fabrics, can be performed efficiently and effectively. For example, monitoring agents can be efficiently deployed externally to the network fabrics being monitored. By deploying the monitoring agents externally (e.g., within a local network external to a border network fabric) the monitoring agents can be more easily deployed, secured (e.g., behind firewall and other networking security appliances), and maintained. The monitoring agents can then monitor the network fabrics with reduced impact on the operation on the network fabrics. For example, the monitoring agents can use test packets (e.g., UDP and/or transmission control protocol (TCP) based ping packets, which could use IPv4 and/or IPv6) to monitor various network devices and their associated network links, which can have less of a network impact than attempting to monitor with traceroutes. When a potential problem is detected, the monitoring agents can employ traceroutes to locate the source of the problem. By only using traceroutes when a problem is detected, the impact on the network fabric can be reduced. Partial traceroutes can then be used to detect gray failures within the network fabric.

The monitoring agents can monitor the network fabrics without needing specialized monitoring devices within the network fabrics. For example, the monitoring agents can send test packets to any device with an Internet protocol (IP) network stack (e.g., router, switch, computer, etc.) within the network fabric. In this way, the monitoring agents can be located at only one end of the path (monitoring agents are not needed at the destination side).

In some implementations, the monitoring agents are located externally to the network fabric. For example, the monitoring agents (e.g., software monitoring agents, hardware monitoring agents, or monitoring agents implemented using a combination of software and hardware) can be located on a network that is separate from, but connected to, the network fabric. In some implementations, the monitoring agents are software agents running on hosts that are connected to a border network fabric. For example, the hosts can be part of a network fabric separate from, but connected to, the border network fabric (e.g., where the hosts utilize the border network fabric to communicate with external networks, such as the Internet). The monitoring agents can be located behind firewall devices and/or other networking devices that provide network security for the monitoring agents.

The monitoring agents monitor the network fabric by sending test packets to various destination devices within the network fabrics. The test packets (e.g., UDP based ping packets or TCP based ping packets) are addressed to destination devices (using IP addresses associated with the destination devices) and have destination ports that have been identified as closed destination ports. For example, the monitoring agents can be pre-configured with destination port numbers that are known to be closed on the destination devices of the network fabric, and the monitoring agents can use one of the closed port numbers in the destination port field of the header of the test packets. As another example, the monitoring agents can obtain the closed destination port numbers dynamically (e.g., from a configuration server).

If a test packet is successfully received by the destination device on the closed destination port, then an ICMP error packet will be sent back to the monitoring agent. Typically, the ICMP error packet will indicate that the destination port is unreachable (e.g., an ICMP message type 3 "destination unreachable" packet with the code value of 3 "destination port unreachable"). However, another type of ICMP error packet can also be received in some situations, such as when the destination host is congested (e.g., an ICMP message type 4 "source quench" packet with the code value of 0 "source quench"). Both types of ICMP error packets (destination port unreachable and the source quench) indicate that the test packet was received by the destination. If the ICMP error packet response is then received by the monitoring agent, the test packet is considered successful (a successful round-trip test of the network devices and links along the particular path taken by the test packet to the destination device, and the ICMP response from the destination device, in the network fabric).

If a response to a test packet is something other than an ICMP error packet (destination port unreachable or source quench), then the test packet is considered unsuccessful. For example, a response packet may be received by the monitoring device indicating that the destination network is unreachable (e.g., due to a network link or routing issue). For example, these other types of responses can indicate that the test packet did not reach the destination device.

If no response to the test packet is received (e.g., within a timeout period), then the test packet is considered unsuccessful. The lack of a response can be caused by the test packet not reaching the destination device (e.g., due to a networking link or routing issue, a hardware failure of a network device, etc.) or a response not reaching the monitoring agent (e.g., due to a networking link or routing issue, a hardware failure of a network device, etc.).

When a problem with the network fabric is detected, then the monitoring agent can use traceroute packets to identify the location of the problem. A problem can be detected, for example, based on the number or rate of unsuccessful test packets (e.g., when the rate of unsuccessful test packets reaches a threshold value, such as over a threshold percentage over a 10 second period). In some implementations, the traceroute packets use the same header parameters as the test packets and/or the same overall packet size so that the traceroute packets will be routed along the same path as the test packets. The location of the network problem can be identified based on the location where the traceroutes stop (also called partial traceroutes). For example, if the traceroutes reach a particular router, and further destinations along the path (e.g., the next hop router) fail to respond to the traceroutes, then the location can be identified as the next hop network link, next hop network device, and/or an associated routing or configuration issue at or near the location where the traceroutes fail.

In some implementations, traceroute information is maintained for various paths of the network fabric. For example, the traceroute information can include weights for the various network devices along the paths (e.g., network devices along good traceroute paths can be weighted higher). When identifying the location of a network problem, the weights can be used. Using the traceroutes, multiple last hops can be determined. It was found that determining next hops resulting in a damping of a signal related to detection of a defective network device. Instead, last hops can be determined which provides a strong signal for detecting failing network devices. A frequency of the last hops can be determined over a predetermined period of time, and a number of times a hop is the last hop (i.e., the frequency) in a plurality of partial traceroutes.

Environments for Actively Monitoring Network Fabrics

FIG. 1 is a diagram showing a compute service provider 100 that can include a multi-tenant environment 110 and a single-tenant environment 112. The multi-tenant environment 110 is a network that can run customer code and hosts virtual machine images. The multi-tenant environment 110 provides shared computer processing resources to customers through a network interface, such as the Internet. It allows on-demand access to a shared pool of server computers, data storage, applications and services offered by the compute service provider. Additionally, the compute service provider 100 can execute monitoring agents 122 within the multi-tenant environment to mimic the environment and behavior of customers. In this way, the compute service provider can understand issues that arise with customer's instances. The single-tenant environment 112 is a trusted environment that does not execute third-party code. Instead, it exposes hardened endpoints for any service that is exposed to customers. The multi-tenant environment 110 can include a plurality of server computers, such as server computer 120. The server computer 120 can host the monitoring agent 122 that transmit packets, such as traceroutes, through a border network 130. The border network 130 allows communication between the multi-tenant and the single-tenant environments and allows both environments 110, 112 to communicate with the Internet 132. Traceroutes that do not make it to a designated destination are called partial traceroutes, such as is shown as an example at 140. The hop that is the last known hop through which the traceroute was passed in the partial traceroute is shown at 142 and is called the "last hop". Each time hop 142 is the last hop, the frequency associated with that hop is increased. Such frequency information can be used to detect defective network devices within the border network 130. The single-tenant network 112 can also include one or more servers, such as server 160, which can transmit traceroutes into the border network 130. Such transmissions can result in partial traceroutes ending at last hop network devices, such as is shown at 170. The server 160 can also include an agent 162 for transmitting traceroutes. Thus, partial traceroutes can be generated by both the multi-tenant environment 110 and the single-tenant environment 112 as communications are passed via the border network fabric 130. In either case, the compute service provider 100 generally controls the agents 122, 162. The last-hop data can be collected in a monitoring server 150 positioned within the single-tenant environment 112. In one example, the agents 122 can pass monitoring data to the monitoring server 150 for analysis. Alternatively, the agents can perform the operations of the monitoring server. The monitoring server 150 can perform frequency analysis on the last hops of the partial traceroutes to determine one or more high-frequency last hops within the border network 130. Such information can be used to detect a gray failure within the border network, as further described below.

In one embodiment, packets are transmitted by one or more agents, such as the agent 122. The packets can be UDP test packets and can be used to determine if there is a problem with any network devices within the border network. Once a potential problem is found, the agent 122 (and potentially other agents) can transmit traceroutes into the border network to obtain additional information. The traceroutes report back each network device through which they pass. In this way, the traceroute is a network diagnostic tool that can be used to obtain a path of a packet through the network, including each network device through which the packet is passed. The history of the packet is recorded. Such information can be used to obtain so-called "last hop" frequency data. The frequency data can be used to determine a network device is faulty, as discussed in detail below. Once such a failure is detected, the network device can be rebooted, taken off line, or otherwise replaced or repaired.

Figure 2:
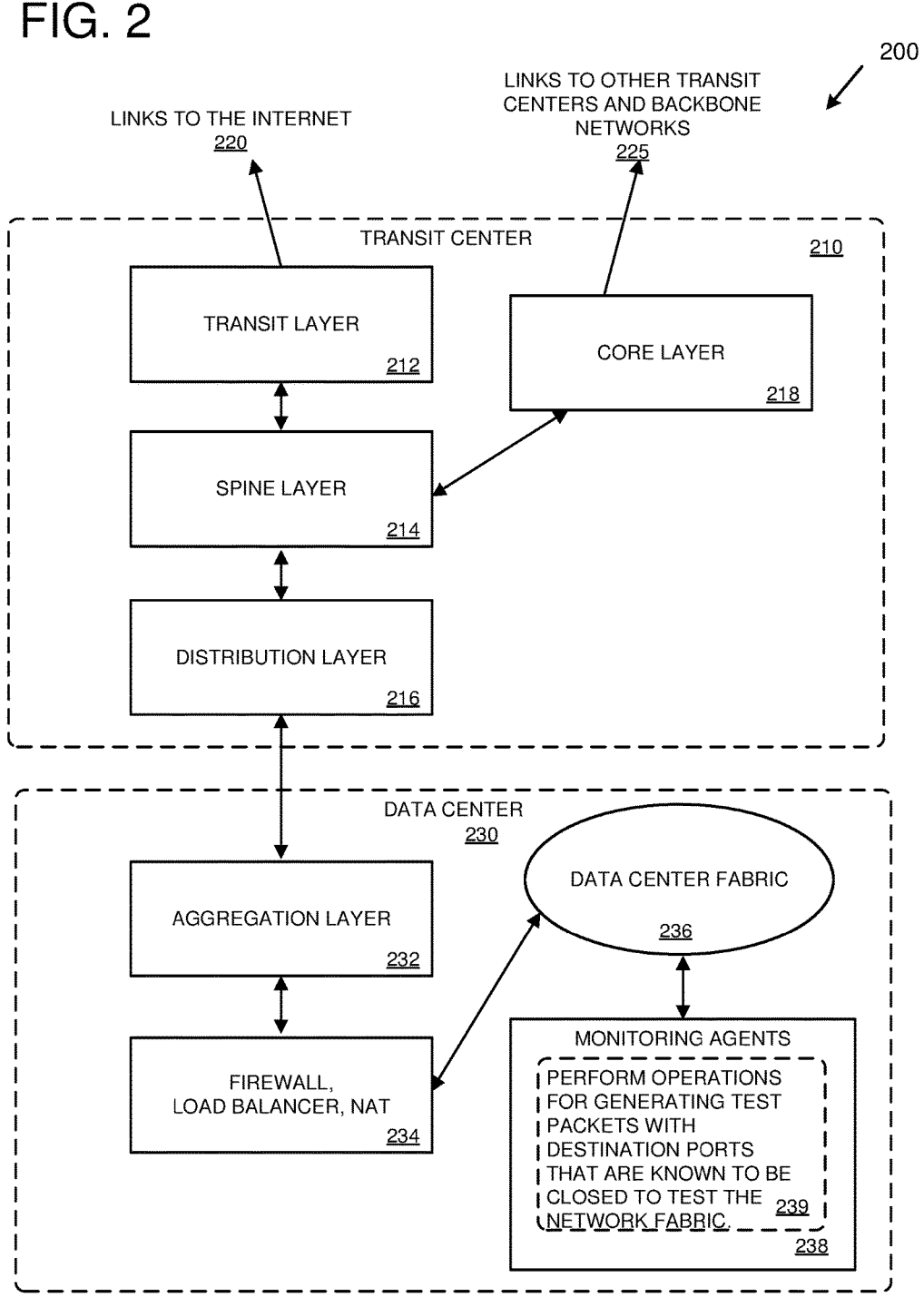
FIG. 2 is a diagram of an example network environment in which border network fabrics are monitored by monitoring agents.

FIG. 2 is a diagram of an example environment 200 in which border network fabrics are monitored by monitoring agents. For example, the environment 200 can represent a collection of computing resources (e.g., servers, networking devices, network links, etc.) located at a particular geographical location (e.g., supporting a data center environment).

As depicted in the environment 200, the computing resources are organized into a transit center 210 and a data center 230. The transit center 210 contains network devices and associated computing resources supporting network communication between the data center 230 and various external networks, such as links to the Internet 220 and links to other transit centers and backbone networks 225. The transit center 210 contains a number of layers of network devices. Specifically, the transit center 210 contains a transit layer 212, a spine layer 214, a distribution layer 216, and a core layer 218. The transit layer 212 provides transit and peering to external networks, such as links to the Internet 220. The spine layer 214 provides connectivity between other layers of the transit center 210. The distribution layer 216 provides connectivity between the transit center 210 and the data center 230. The core layer 218 provides connectivity to other networks which may be associated with the same business or organization, such as the links to other transit centers and backbone networks 225. In other implementations, the transit center 210 may comprise more, or fewer, layers than those depicted, and/or may contain layers other than those depicted.

The data center 230 comprises an aggregation layer 232, a collection of firewall, load balancer, and network address translation (NAT) resources 234, a data center fabric 236, and monitoring agents 238. The aggregation layer 232 aggregates network traffic for the various computing resources of the data center 230. For example, the data center 230 may be organized into different collections of computing resources, which could represent different rooms or buildings of the data center 230. The firewall, load balancer, and NAT resources 234 provide network traffic management and security for the data center fabric 236 and other computing resources connected to the data center fabric 236, such as the monitoring agents 238. The data center fabric (e.g., a multi-tiered network such as a Clos network) provides connectivity for the computing resources of the data center 230 (e.g., server computers, database resources, storage resources, etc.).

The monitoring agents 238, which can be software and/or hardware agents, monitor the various network layers of the data center 230 and the transit center 210. As depicted at 239, the monitoring agents 238 perform operations for generating test packets with destination ports that are known to be closed in order to test the various layers of the network fabric, including the layers of the transit center 210 and the data center 230. For example, the monitoring agents 238 can send test packets (e.g., UDP test packets) to particular network devices (e.g., routers) within the various layers (e.g., to routers located within the transit layer 212).

In some implementations, the layers of the transit center 210 along with the aggregation layer 232 and the firewall, load balancer, and NAT resources 234, form a border network fabric. The monitoring agents 238 are located externally to the border network fabric and perform operations for monitoring the border network fabric. The monitoring agents 238 can be in communication with a centralized monitoring server (not shown in FIG. 2), that can receive monitoring data from the monitoring agents to make determinations about whether network devices within the border fabric are defective.

In some implementations, the monitoring agents 238 test the border network fabric using UDP test packets, which are addressed to destination devices within the border network fabrics (e.g., network devices at various layers of the border network fabric, such as the transit layer 212) and that have destination ports that have been identified as closed destination ports. The monitoring agents 238 send the UDP test packets to the destination devices and collect results. A UDP test packet is considered to be successful when an ICMP error packet response is received, which indicates that the UDP test packet was successfully received by the destination device and produced the expected response message. A UDP test packet is considered to be unsuccessful if either a different response is received (other than the expected ICMP error packet response) or no response is received (e.g., within a timeout period, which could be a number of seconds for example). An unsuccessful UDP test packet indicates a potential network problem, such as a link that is not operating properly (e.g., the link may be down, have intermittent connection problems, or be congested) and/or a device that is not operating properly (e.g., a router with a hardware problem, a congestion issue, a routing or configuration issue, etc.).

The monitoring agents 238 can send many UDP test packets to various parts of the border network fabric in order to fully test the border network fabric or portions of the border network fabric. In addition, the monitoring agents 238 can vary parameters of the UDP test packets to ensure that the UDP test packets are spread (e.g., spread evenly or equally) among the various paths within the border network fabric. For example, the monitoring agents 238 can vary source and destination port numbers so that various paths are tested (e.g., utilizing equal-cost multi-path (ECMP) routing).

Example Service Provider Environments

Figure 3:
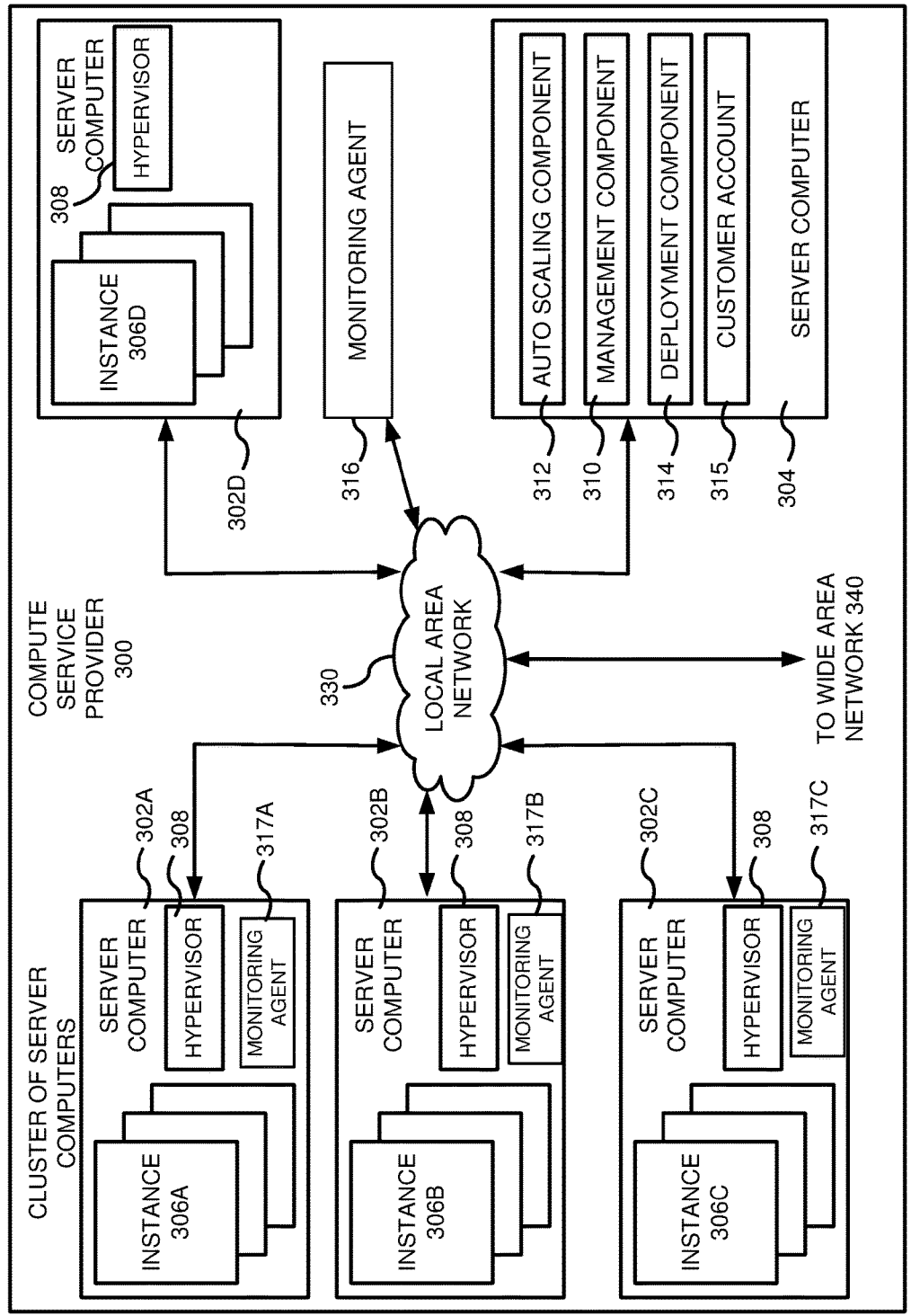
FIG. 3 is an example system diagram showing a plurality of virtual machine instances running in a multi-tenant environment.

FIG. 3 is a computing system diagram of a network-based compute service provider 300 that illustrates one environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example, each of the servers 302A-302D can be configured to execute a hypervisor 308 or another type of program configured to enable the execution of multiple instances 306 on a single server. For example, each of the servers 302A-302D can be configured (e.g., via the hypervisor 308) to support one or more virtual machine slots, with each virtual machine slot capable of running a virtual machine instance (e.g., server computer 302A could be configured to support three virtual machine slots each running a corresponding virtual machine instance). Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances. Additionally, it will be understood that a computer system can comprise multiple individual computers.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

A network 330 can be utilized to interconnect the server computers 302A-302D and the server computer 304. The network 330 can comprise a Clos network. The network 330 can be a local area network (LAN), such as a multi-tiered network (e.g., Clos network), and can be connected to a wide area network (WAN) 340 so that end users can access the compute service provider 300. The wide area network 340 can connect to a border network fabric providing access to the internet and/or to other networks (e.g., peering connections to other network locations). It should be appreciated that the network topology illustrated in FIG. 3 has been simplified and that many more networks and networking devices can be utilized to interconnect the various computing systems disclosed herein.

In some implementations, a monitoring agent 316 performs operations for actively monitoring network fabrics, such as a network fabric (e.g., a border network fabric) connected to the wide area network 340. For example, the monitoring agent 316 can be a software monitoring agent running on a host computer. The monitoring agent 316 can send test packets to monitor the network fabric, analyze results, detect potential network problems, and identify the location of the network problems within the network fabric. Monitoring agents can also run on one or more of the server computers 302A-302D. For example, monitoring agent 317A-C can be a software monitoring agent running on server computer 302A-C (e.g., running on one of the instances 306A). Thus, multiple of the servers 302 can include monitoring agents, but not all servers need to include the monitoring agents.

Figure 4:
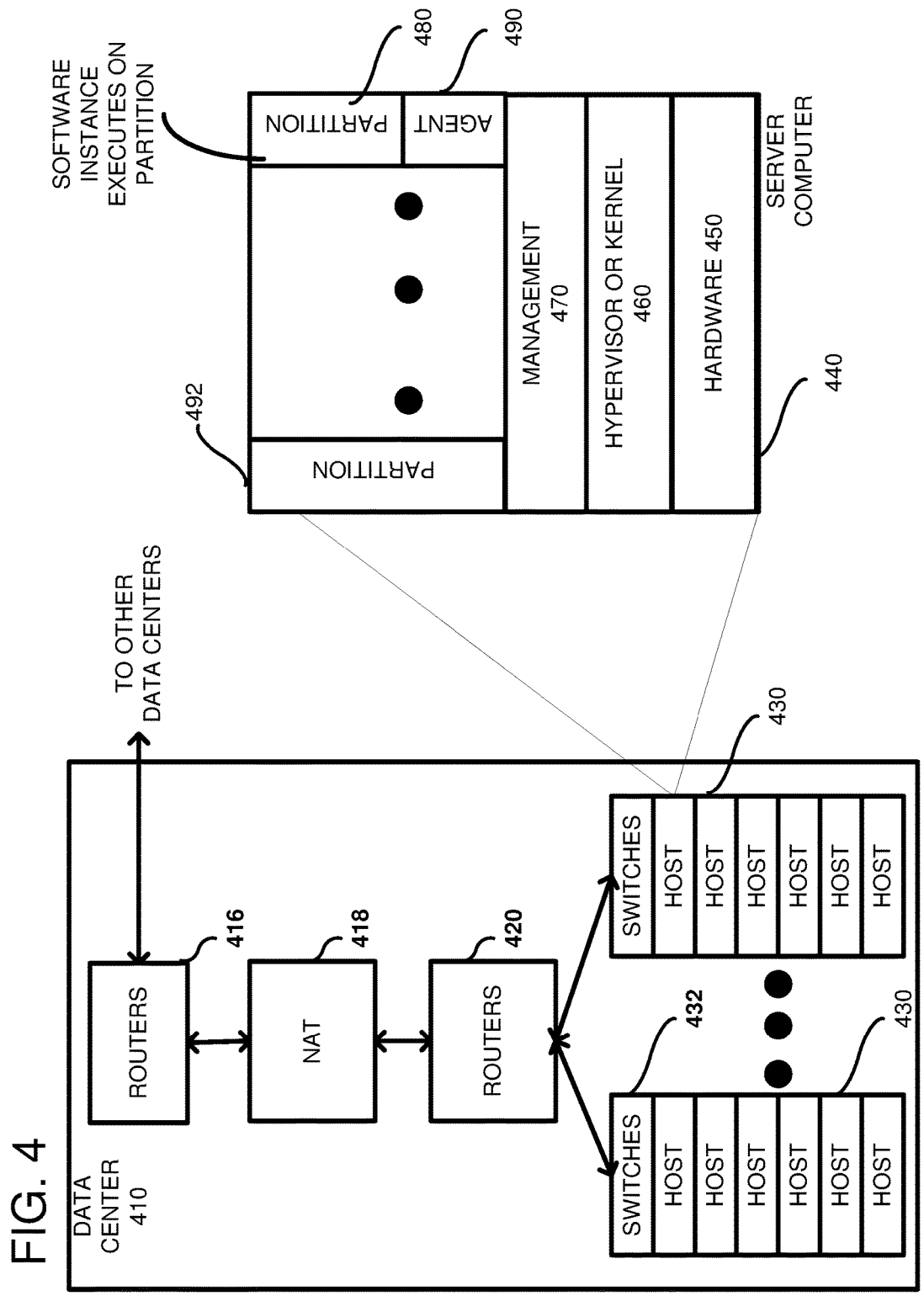
FIG. 4 is an example showing a monitoring agent positioned on a partition within a multi-tenant environment.

FIG. 4 illustrates a data center associated with the compute service provider 300 and the physical hardware associated therewith. The compute service provider 300 can include a plurality of data centers, such as data center 410, coupled together by routers 416. The routers 416 read address information in a received packet and determine the packet's destination. If the router decides that a different data center contains a host server computer, then the packet is forwarded to that data center. If the packet is addressed to a host in the data center 410, then it is passed to a network address translator (NAT) 418 that converts the packet's public IP address to a private IP address. The NAT also translates private addresses to public addresses that are bound outside of the datacenter 410. Additional routers 420 can be coupled to the NAT to route packets to one or more racks of host server computers 430. Each rack 430 can include a switch 432 coupled to multiple host server computers. A particular host server computer is shown in an expanded view at 440.

Each host 440 has underlying hardware 450 including one or more CPUs, memory, storage devices, etc. Running a layer above the hardware 450 is a hypervisor or kernel layer 460. The hypervisor or kernel layer can be classified as a type 1 or type 2 hypervisor. A type 1 hypervisor runs directly on the host hardware 450 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 470 can be part of the hypervisor or separated therefrom and generally includes device drivers needed for accessing the hardware 450. The partitions 480 are logical units of isolation by the hypervisor. Each partition 480 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. The monitoring agent 316 can receive traceroute data from the local monitoring agent so as to triangulate on a network device exhibiting a gray failure.

A monitoring agent 490 is positioned on one or more of the partitions 480. The monitoring agent can correspond to the agent 122 of FIG. 1. As such, the agent 122 can send and receive packets to and from echo servers located in other parts of the data center or in other data centers so as to check network devices. The agent 490 can be executing in the same server computer 440 as client virtual machines executing on other of the partitions, such as partition 492. As such, the agent 490 sending packet data through network devices follows a same path as client virtual machines sending packet data, so as to mimic the client virtual machines. However, the monitoring agent remains under the control of the compute service provider. If problems are detected, the monitoring agent 490 can transmit targeted traceroutes to the problem area of the network. Once monitoring data is received back, such as hops traversed by the traceroutes and last-hop data, the agent can transmit the data to a central monitoring server, such as server computer 316 of FIG. 3, for further analysis, such as triangulating on network devices exhibiting gray failures.

Methods for Actively Monitoring Network Fabrics

In any of the technologies described herein, methods can be provided for actively monitoring network fabrics, including border network fabrics and other types of network fabrics. Monitoring can be performed using test packets (e.g., UDP and/or TCP ping packets) sent to destination devices and using destination ports that have been identified as closed ports. Furthermore, monitoring can be performed using traceroutes that gather information about every hop that is traversed by a packet.

Figure 5:
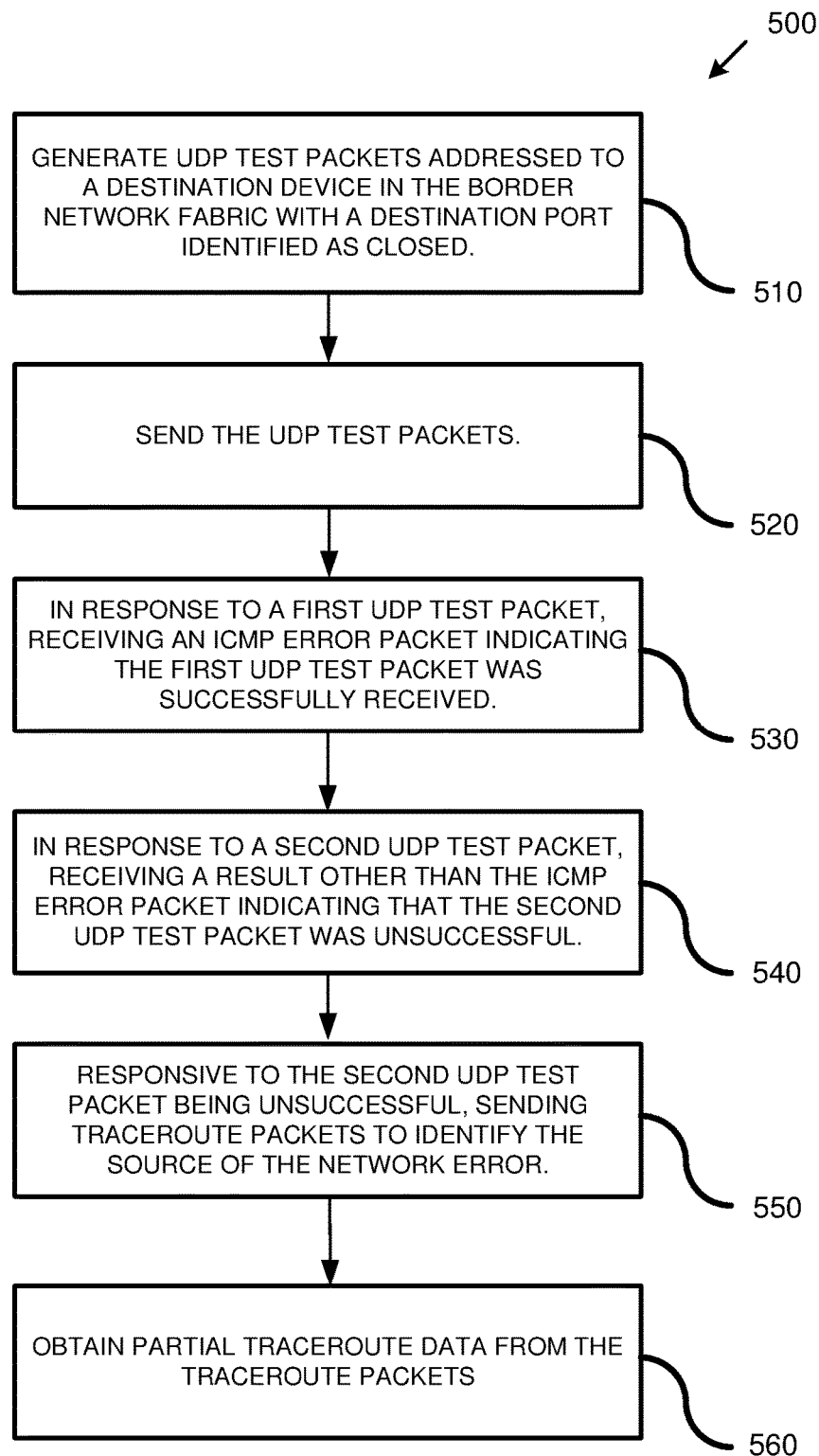
FIG. 5 is a flowchart of an example method for monitoring border network fabrics using user datagram protocol (UDP) test packets.

FIG. 5 is a flow chart of an example method 500 for monitoring border network fabrics using UDP test packets. The example method 500 can be performed by a monitoring agent (e.g., a software monitoring agent) located externally to the network fabric.

At 510, UDP test packets are generated by a monitoring agent. The UDP test packets are addressed to a destination device within the border network fabric and have a destination port that has been identified as a closed destination port. Although UDP test packets are shown in this embodiment, other protocols can be used, such as the Transmission Control Protocol (TCP).

At 520, the UDP test packets are sent for delivery to the destination device. For example, the monitoring agent can generate the UDP test packets and provide them to a network interface for transmission via a network link connected, directly or via intermediate networks, to the border network fabric.

At 530, in response to a first UDP test packet, an ICMP error packet is received indicating that the first UDP test packet was successfully received by the destination device. At 540, in response to a second UDP test packet, a result other than the ICMP error packet is received (e.g., either a response packet other than the ICMP error packet or no response within a timeout period) indicating that the second UDP test packet was unsuccessful.

At 550, responsive to the unsuccessful second UDP test packet, traceroute packets are sent to identify the source of the network error within the border network fabric. In some implementations, the decision to send traceroute packets is based on the number of UDP test packets that are unsuccessful over a period of time.

At 560, partial traceroute data can be obtained relating to the traceroute packets. Specifically, the traceroute packets transmit information associated with every node in the network that they reach. For partial traceroutes, there is a last node, (also called last hop), from which data is received and the packet does not reach or traverse another node in route to its destination. As such, the partial traceroutes are incomplete routes that result in last-hop frequency data that can be used in determining an overall health of network devices.

Figure 6:
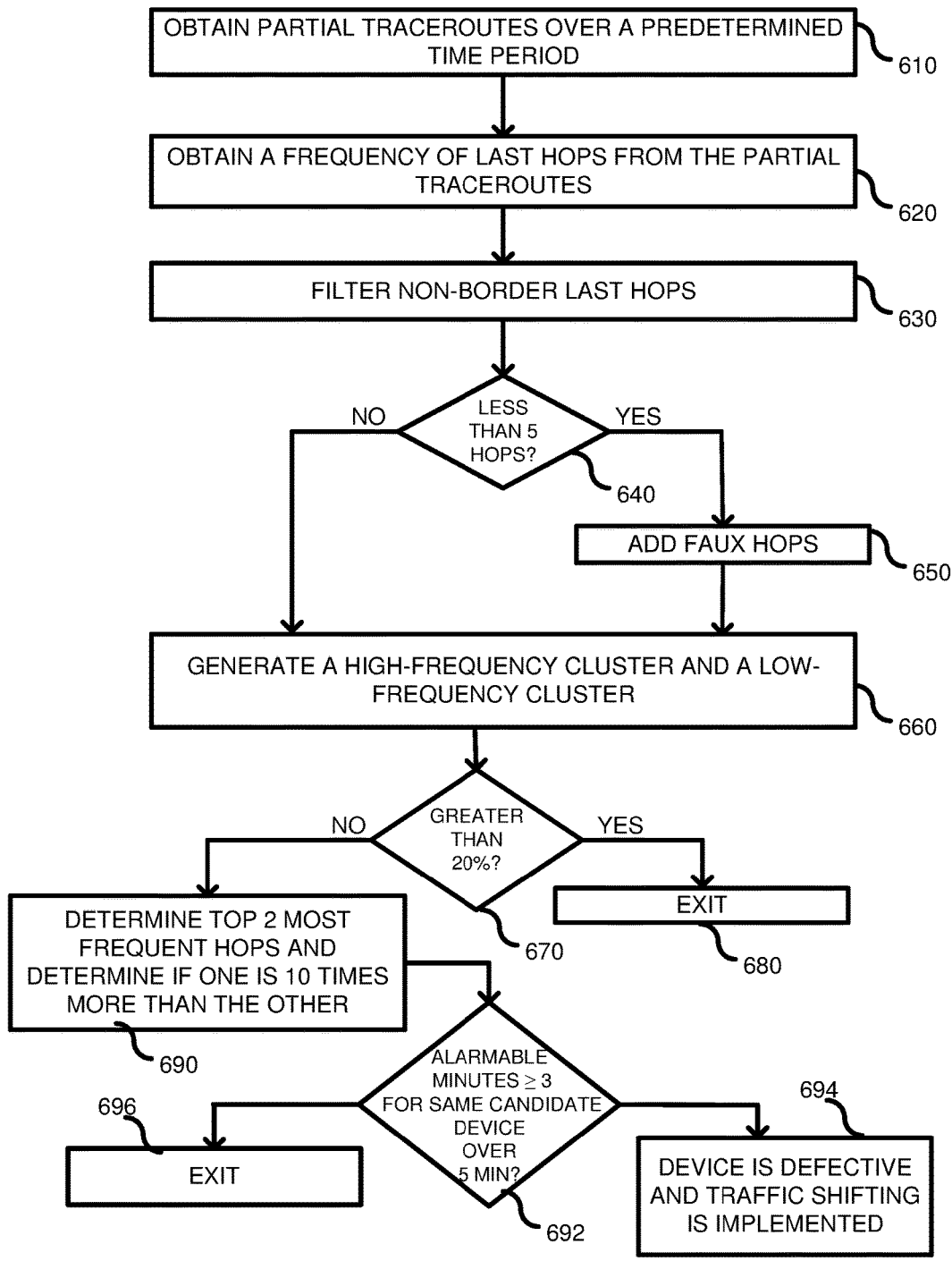
FIG. 6 is a flowchart of an example method for detecting failures using frequency analysis of last-hop data.

FIG. 6 is a detailed flowchart according to an embodiment for monitoring network devices for failures. In process block 610, partial traceroutes can be obtained over a predetermined time period. For example, process block 560 of FIG. 5 described obtaining partial traceroutes. Such traceroutes can be divided into time windows, such as traceroutes obtained during a first minute, during a second minute, and so on. In process block 620, a frequency of last hops are computed from the partial traceroutes. Thus, the traceroute data can be transformed into last-hops frequency data within the time windows. For example, if a particular last hop was the last hop in multiple traceroutes over a given time period, its frequency would be equal to the number of times it was the last hop for each traceroute. In process block 630, last hops that are outside of the border area are filtered. For example, in this particular embodiment, a focus of the monitoring is within the border network. As a result, last-hop data outside of the border network can be discarded. However, in other embodiments, network devices outside of the border area can be included in the analysis. In decision block 640, a check is made whether a number of last hops in the current data set is less than a predetermined limit, such as 5 hops, in this example. Other numbers can be used. If decision block 640 is answered in the affirmative, then in process block 650, faux last hops (i.e., network devices) are added to the data set so there is a minimum number of hops to compare against. The faux last hops can have a fixed frequency, such as 1. The faux last hops are fictitious and used only for the purpose of analysis. The output of process block 650 or if process block 640 is answered in the negative, then in process block 660, clustering is performed. The clustering can performed using a clustering algorithm, such as k-means clustering. One specific example is a version of k-means clustering by Hartigan and Wong (1979). However, other clustering algorithms can be used, such as any connectivity models (e.g., hierarchical clustering), centroid models, distribution models, density models, group models, neural models, etc. The result can be two groups of last hops, one with a highest frequency and one with a lower frequency.

In decision block 670, a check is made whether the high-frequency cluster has greater than 20% of the hops in the border network. Although 20% was chosen for this embodiment, other threshold numbers can be used. If the problem is not localized, but wide spread, then decision block 670 is answered in the affirmative and the process exits at 680. The algorithm is designed to identify a single hop and if too many hops are identified as potentially problematic then a different solution can be employed. On the other hand, if decision block 670 is answered in the negative, then two sets of hops are taken from the cluster, such as the two hops having the highest frequency, and a difference is calculated. In one example a log 10 of their frequencies are used, and if one is 10 times the value of the other, then the candidate hop is marked as alarmable for that time period. In decision block 692, a check is then made whether the candidate hop has been identified as alarmable in 3 different time periods (e.g., 3 or more times over the last 5 minutes), then the device is deemed defective in process block 694. In such a case, the device can have traffic shifted away from it. For example, the device can be either automatically rebooted, removed, taken off-line or replaced. Otherwise, the process exits at 696 and can be repeated again.

Figure 7:
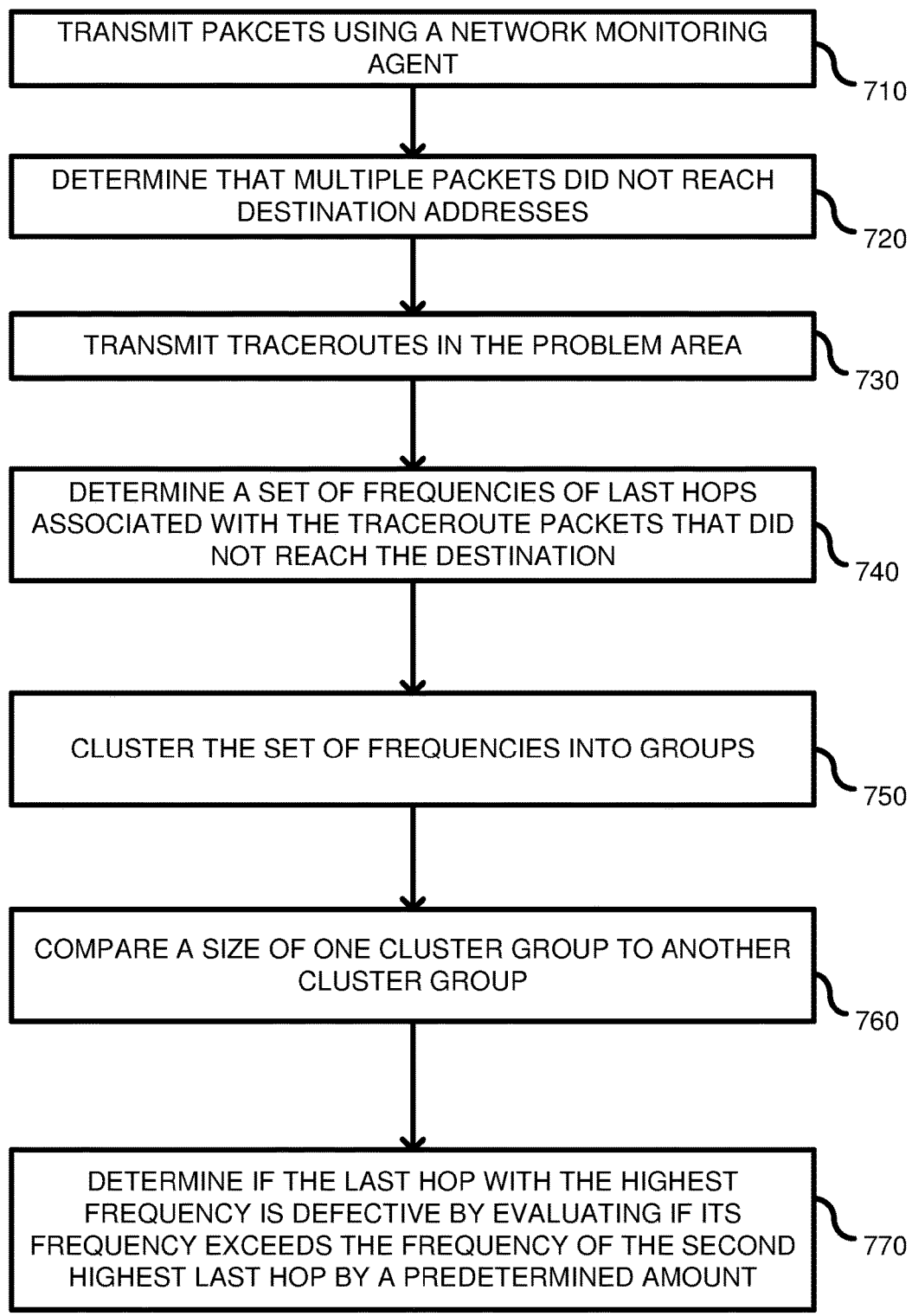
FIG. 7 is a flowchart of another example method for detecting failures using frequency analysis of last-hop data.

FIG. 7 is another embodiment of a flowchart for monitoring network devices. In process block 710, packets are transmitted using a network monitoring agent. For example, in FIG. 1, a monitoring agent 122 within a multi-tenant environment can be used to inject packets into the border network. In process block 720, a determination is made that multiple packets failed to reach destination addresses. As a result, in process block 730, traceroutes can be injected into the problem area to obtain last-hop frequency information. Again, the monitoring agent 122 can be used to inject traceroutes into the border network. As a result of the traceroutes, information related to hops that are traversed by the traceroute packets are transmitted back to the monitoring agent. If a plurality of monitoring agents are used, their data can be transmitted to a central monitoring server, such as is shown at 150 in FIG. 1, or at 316 in FIG. 3. In process block 740, a set of frequencies of last hops associated with the traceroutes are determined for so-called partial traceroutes wherein a destination was not reached. In process block 750, the set of frequencies are clustered into groups, such as two groups. If there are insufficient groups, dummy devices can be inserted into the set of frequencies with a predetermined frequency count (e.g., 1) so as to obtain at least two groups. The dummy devices ensure that there are a minimum number of hops to compare against. The dummy devices are fictitious and are only used for purposes of analysis. Thus, a check can be made to ensure that at least two groups exist, and if less than two groups exist, a predetermined group of dummy devices are inserted into the data so that a later comparison can be performed. The set of frequencies can also be filtered if only border network devices are desired. In process block 760, size is compared of one cluster group to another cluster group. In one example, the most frequent last hop is compared with another last hop within the set of frequencies. Thus, two groups are compared, but additional groups can be added. In process block 770, a determination is made if the last hop with the highest frequency is defective by evaluating if its frequency exceeds the frequency of the second highest last hop by a predetermined amount. For example, a determination is made whether the frequency associated with one group exceeds the frequency associated with another group by a predetermined amount, such as by taking a difference, a log calculation, etc. In one example, if the frequency of one group is higher than that of the other group (e.g., 10 times higher, or another proportion), then the last hop associated with the higher frequency group is considered defective. Corrective action can then be taken, such as by rebooting the problem device.

Figure 8:
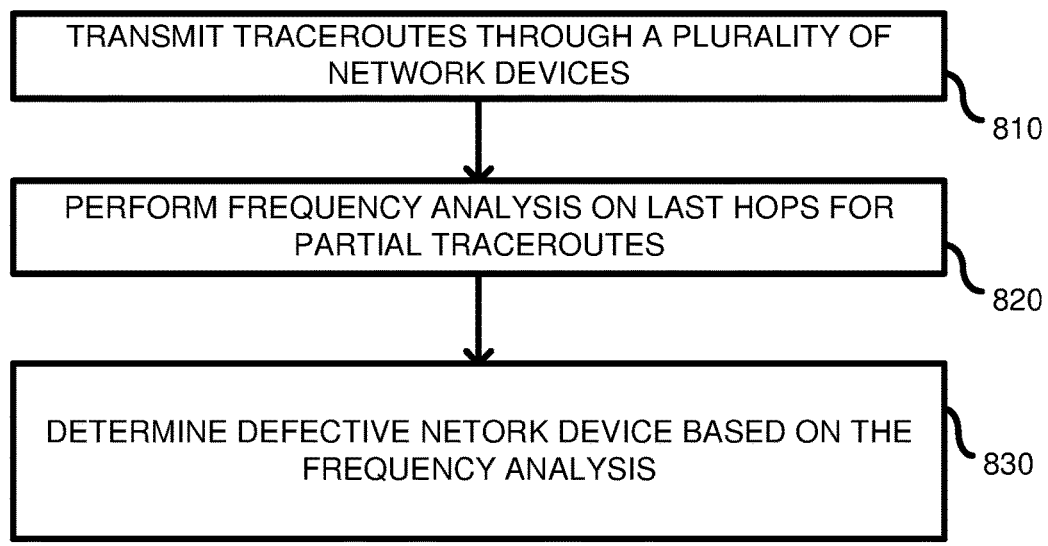
FIG. 8 is a flowchart of yet another example method for detecting failures using frequency analysis of last-hop data.

FIG. 8 is a flowchart of a method according to another embodiment for detecting failures in network devices. In process block 810, traceroutes are transmitted through a plurality of network devices. As previously explained, the traceroutes can be in response to a detection of packet loss. Alternatively, the traceroutes can be a periodic probe of the network without a previous detection of packet loss. The traceroutes can be packets that when received by each network device, a processor within the network device identifies that the packet is a traceroute and transmits a response packet back to the monitoring agent that the traceroute was received in the network device. The processor can then forward the traceroute towards a next hop in the network. A processor in the next hop, likewise, transmits a response packet, and so on, until the traceroute reaches its final destination or reaches a last hop prior to becoming lost. In process block 820, a frequency analysis is performed on last hops for the partial traceroutes. Last-hop data can be obtained and analyzed to determine whether a traceroute made it to a final destination. If not, the traceroute is considered a partial traceroute and frequency analysis can be performed to determine a number of times a network device has been a last hop in a partial traceroute. In process block 830, a defective network device can be determined based on the frequency analysis. The frequency analysis can include clustering, into groups, last-hop data and comparing the groups to determine if one group exceeds another group by a predetermined amount. If so, then devices within the highest frequency group are considered defective. Once a defective device is determined, automatic corrective action can be taken to repair the network device, such as performing a hard or soft reboot of the device.

Figure 9:
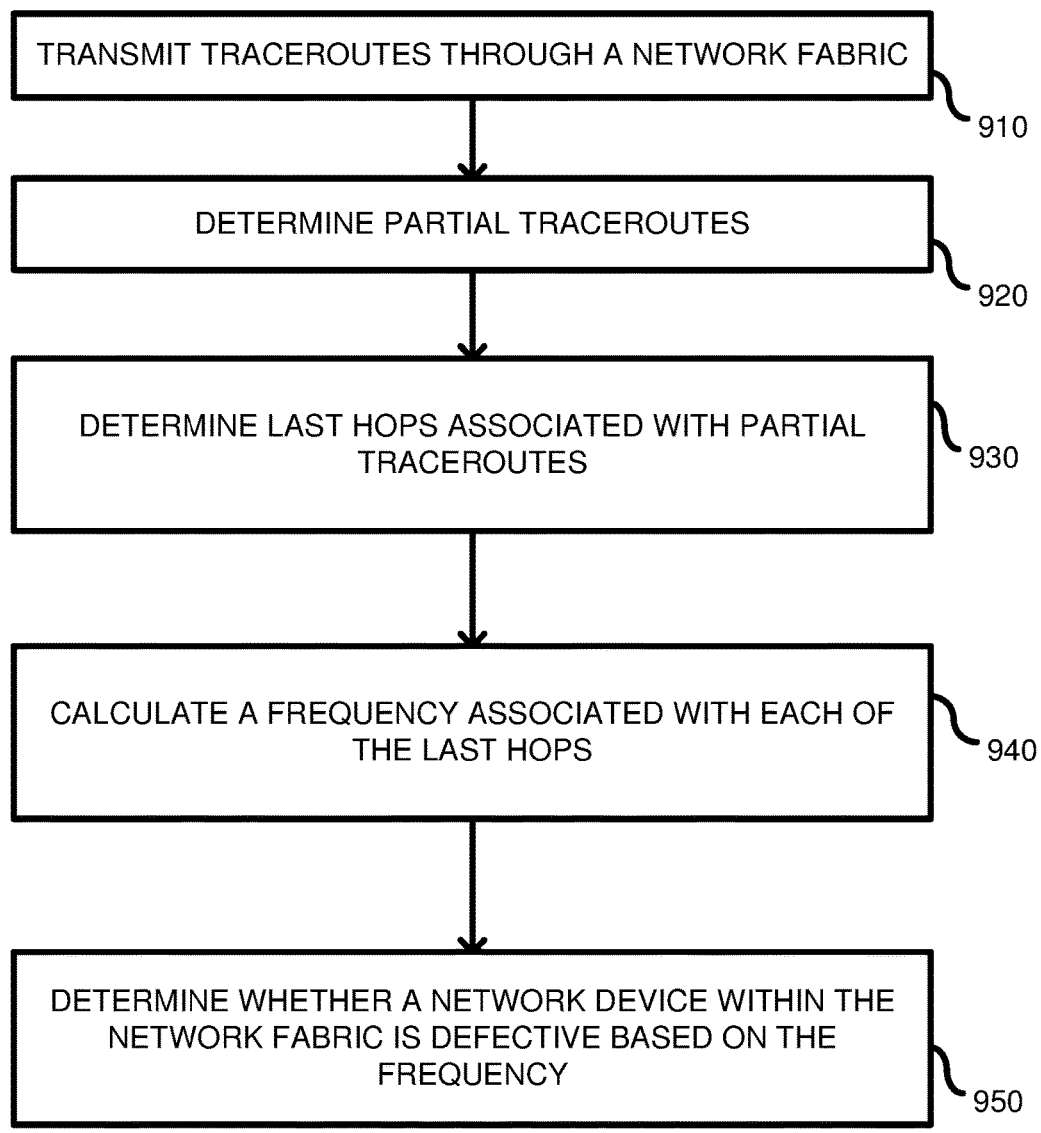
FIG. 9 is a flowchart of yet another example method for detecting failures using frequency analysis of last-hop data.

FIG. 9 is a flowchart according to one embodiment for determining failures of network devices in a network, such as a border network. In process block 910, traceroutes are transmitted through a network fabric. The traceroutes provide information to a monitoring agent or to a monitoring server related to hops (i.e., network devices) that are traversed as the traceroute passes through network devices on the way to its final destination. In process block 920, partial traceroutes are determined. For example, the traceroute data can be analyzed to determine which of the traceroutes did not arrive at a destination associated with the traceroute. In process block 930, last hops associated with the partial traceroutes are identified. Thus, a last network device that responded in the partial traceroute is a last hop. In process block 940, a frequency is calculated associated with each of the last hops. Thus, each partial traceroute having a same last hop can result in a counter for that last hop that is incremented. The counter represents frequency information associated with the last hop that is calculated. In process block 950, a determination can be made whether a network device within the network fabric is defective based on the frequency. For example, a determination can be made of the two most frequent last hops amongst the partial traceroutes. A comparison can then be made between the frequency of each. If the difference exceeds a threshold, then the higher frequency last hop can be used to determine the defective device. Specifically, the defective device can be the last hop itself or neighbor devices to the last hop. In any event, the defective devices are triangulated and corrective action is taken.

Rolling Time Windows

Figure 10:
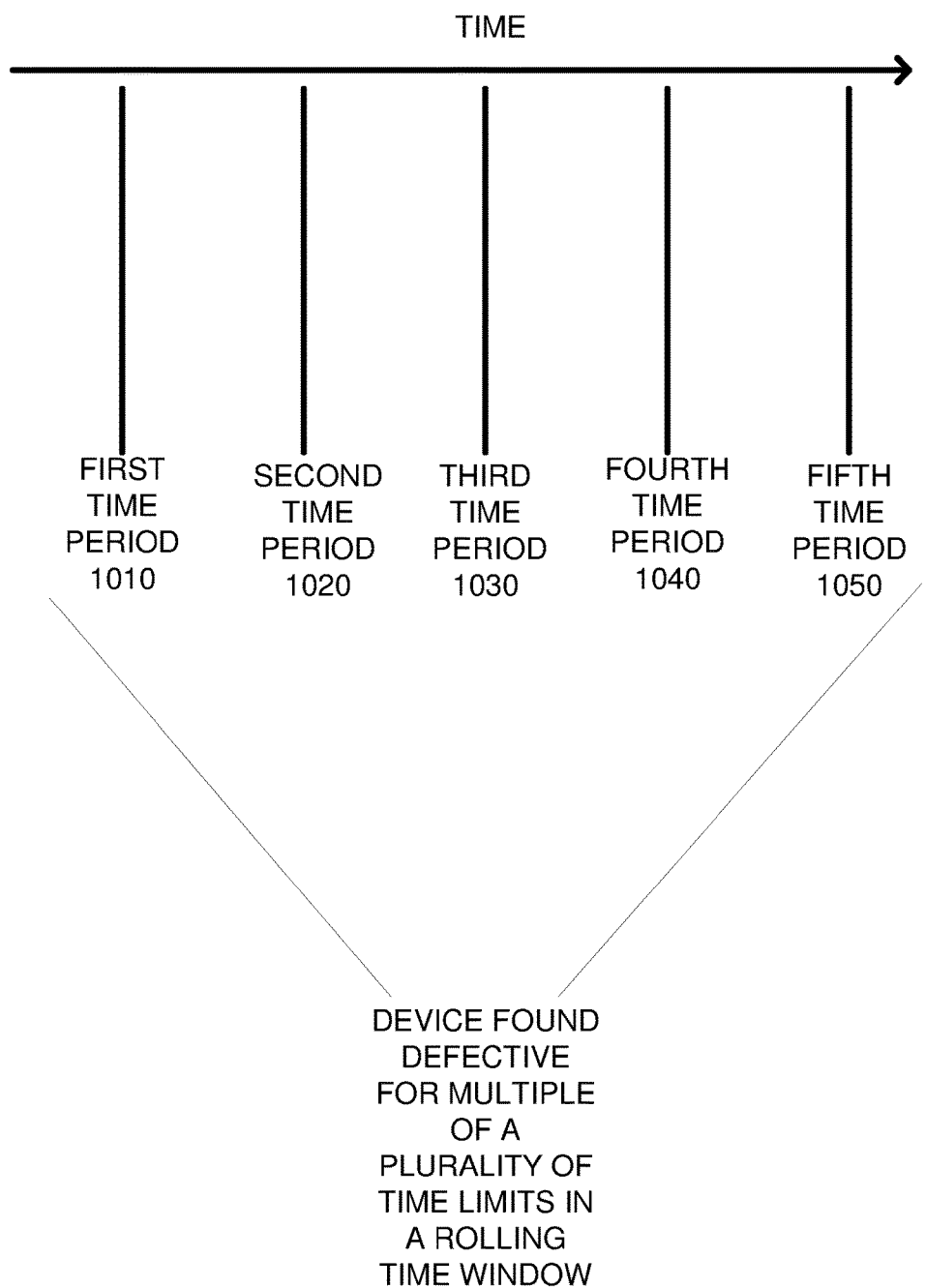
FIG. 10 is a depiction of a rolling time window used for detecting failures.

FIG. 10 shows a rolling time window used for analyzing the traceroutes. Each time period can be a predetermined interval (e.g., 1 minute). A determination of whether a device is defective can include determining that the device is defective multiple times within a time window. Thus, a first determination can be made during a first time period 1010 (e.g., a first minute), a second determination can be made during the second time period 1020, etc. Similar determinations can be made for successive time periods 1030, 1040 and 1050. If the same hop is defective for a threshold number of time periods (e.g., 3 out of 5 time windows) then the device can be deemed defective. Decision block 692 of FIG. 6 is one example embodiment wherein the same candidate device is alarmable (e.g., requires repair) for more than 3 minutes during a 5 minute period. Other thresholds and time periods can be used.

Additional Service Provider Environment

Figure 11:
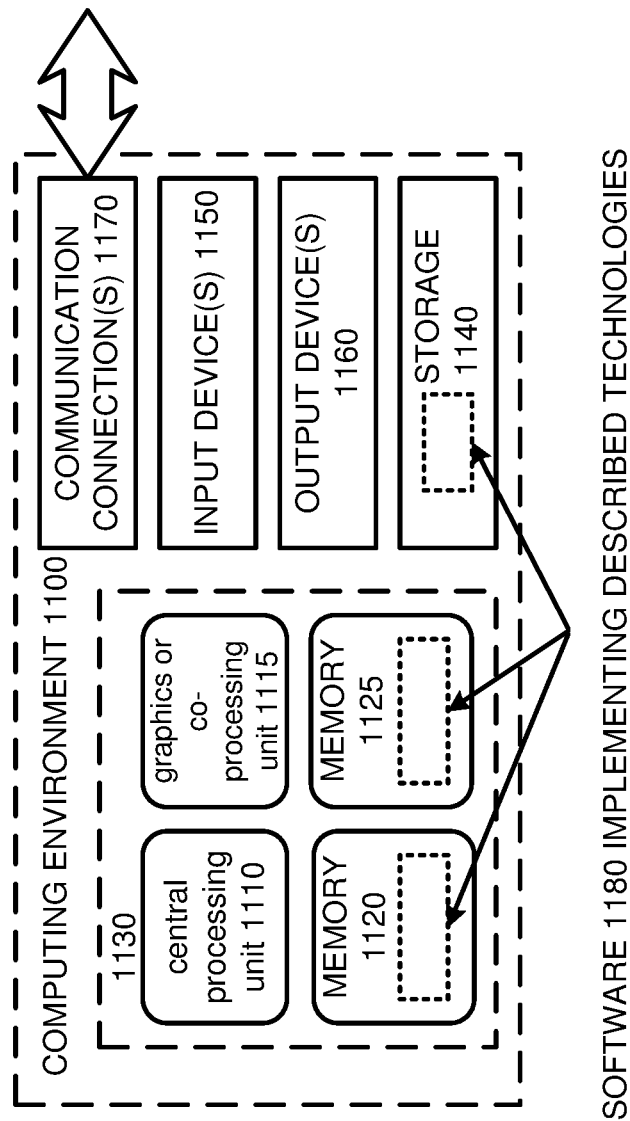
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.)

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s). For example, the computing environment 1100 can be associated with the monitoring server 150 from FIG. 1.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of monitoring network devices for failures, the method comprising:
   transmitting packets in a network using a network monitoring agent executing on a server computer;
   determining that multiple packets transmitted by the network monitoring agent did not reach respective destination addresses of the multiple packets;
   transmitting traceroute packets in order to determine why the multiple packets did not reach the destination addresses;
   determining a set of frequencies of last hops associated with the traceroute packets that did not reach the destination addresses;
   clustering the set of frequencies into first and second groups, wherein the first group is a high-frequency group of last hops and the second group is a lower-frequency group of last hops;
   comparing a most frequent last hop in the first group with another last hop in the second group within the set of frequencies; and
   determining a network device associated with the most frequent last hop is defective when its frequency exceeds the other last hop frequencies by a predetermined amount; and
   re-routing network traffic around the network device.

2. The method of claim 1, further including tracking the traceroute packets that were transmitted over a predetermined period of time.

3. The method of claim 1, further including inserting dummy last hops with a predetermined frequency count into the second group so as to obtain the second group that is within the set of frequencies.

4. The method of claim 1, further including filtering non-border network nodes from the set of frequencies.

5. The method of claim 1, further including determining that there are at least two failures for a same device over different time periods.

6. One or more computing devices, comprising:
   one or more processing units; and
   one or more network interfaces;
   wherein the one or more computing devices are configured to perform operations for monitoring a plurality of network devices in a computer network, the operations comprising:
   transmitting traceroutes through the plurality of network devices;
   for traceroutes that do not reach a destination, performing frequency analysis on last hops associated with the traceroutes, wherein the frequency analysis includes determining a set of frequencies of last hops associated with the traceroutes that did not reach the destination, clustering the set of frequencies into first and second groups of different frequencies and comparing a most frequent last hop in the first group with another last hop in the second group within the set of frequencies; and
   determining that at least one network device is defective based on the frequency analysis including that the most frequent last hop in the first group exceeds a frequency of the last hop in the second group by a predetermined amount.

7. The one or more computing devices of claim 6, wherein the transmitting of the traceroutes is over multiple rolling time windows, and wherein the frequency analysis is repeated for each rolling time window.

8. The one or more computing devices of claim 7, wherein the determining that the at least one network device is defective includes determining that the at least one network device is defective in multiple of the rolling time windows.

9. The one or more computing devices of claim 6, the operations further including inserting data for faux network devices into the frequency analysis; and
   comparing the frequency analysis of the at least one network device to a frequency analysis of one of the faux network devices and determining the at least one network device is defective based on the comparison.

10. The one or more computing devices of claim 6, the operations further including grouping results of the frequency analysis using a clustering algorithm to form at least two groups of the network devices.

11. The one or more computing devices of claim 6, wherein the plurality of network devices are within a border network coupling a multi-tenant environment to a single-tenant environment.

12. The one or more computing devices of claim 11, the operations further including filtering network devices that are not within the border network.

13. The one or more computing devices of claim 6, wherein the plurality of network devices are within a network fabric and wherein the one or more computing devices are server computers positioned external to the network fabric.

14. The one or more computing devices of claim 6, the operations further including if a number of network devices that are defective is greater than a predetermined number, discarding the frequency analysis.

15. A computer-readable storage medium, which is non-transitory, including instructions that upon execution cause a computer system to:
transmit traceroutes through a network fabric;
determine partial traceroutes;
determine last hops associated with the partial traceroutes;
calculate a frequency associated with each of the last hops;
clustering the frequency associated with each of the last hops into first and second groups including a high-frequency group and low-frequency group; and
determine whether a network device within the network fabric is defective based on the frequency by comparing a most frequent last hop in the first group with another last hop in the second group.

16. The computer-readable storage medium according to claim 15, wherein the determining whether the network device is defective includes determining two most frequent last hops; and
wherein the instructions, upon execution, further cause the computer system to:
compare a difference between the frequency of each of the two most frequent last hops; and
determine the network device is defective if a result of the comparison exceeds a threshold.

17. The computer-readable storage medium according to claim 15, wherein the instructions, upon execution, further cause the computer system to:
filter the partial traceroutes so that only partial traceroutes for network devices in a border network are analyzed.

18. The computer-readable storage medium according to claim 15, wherein the instructions, upon execution, further cause the computer system to:
transmit the partial traceroutes from an agent within a multi-tenant environment, or single-tenant environment, or border fabric.

19. The computer-readable storage medium according to claim 15, wherein the instructions, upon execution, further cause the computer system to:
perform a clustering algorithm on the calculated frequencies to determine two sets of frequencies that are the largest.

20. The computer-readable storage medium according to claim 19, wherein the instructions, upon execution, further cause the computer system to:
compute a difference between the at least two frequencies within the two sets, and wherein the determining whether the network device is defective includes determining if the difference exceeds a threshold.

* * * * *